July 15, 1941.     S. W. BRIGGS ET AL     2,249,681
POROUS BLOCK FILTER IN LUBRICATING SYSTEM OF INTERNAL COMBUSTION ENGINES
Filed April 1, 1936     2 Sheets-Sheet 1
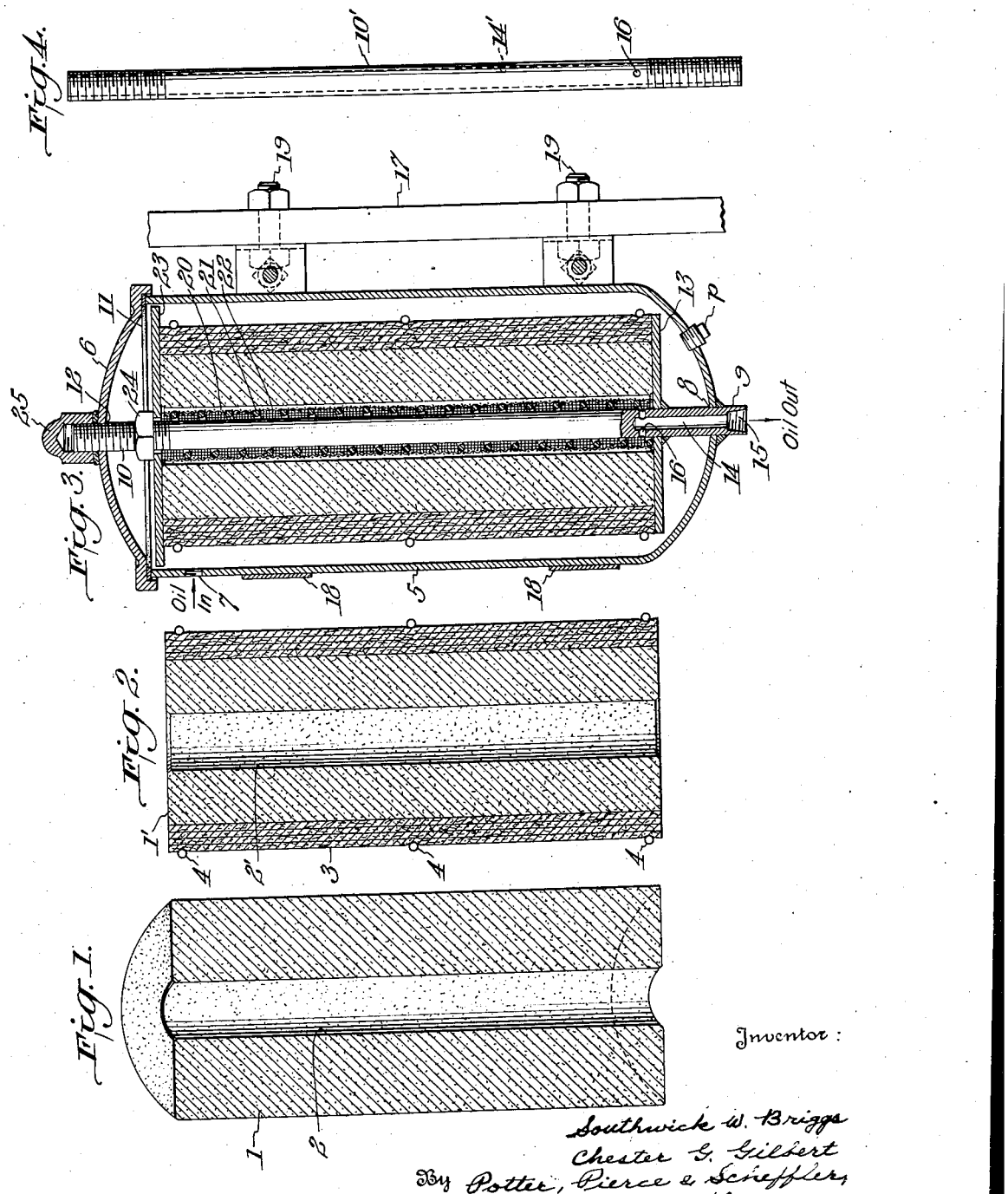
Inventor:
Southwick W. Briggs
Chester G. Gilbert
By Potter, Pierce & Scheffler
Their Attorneys

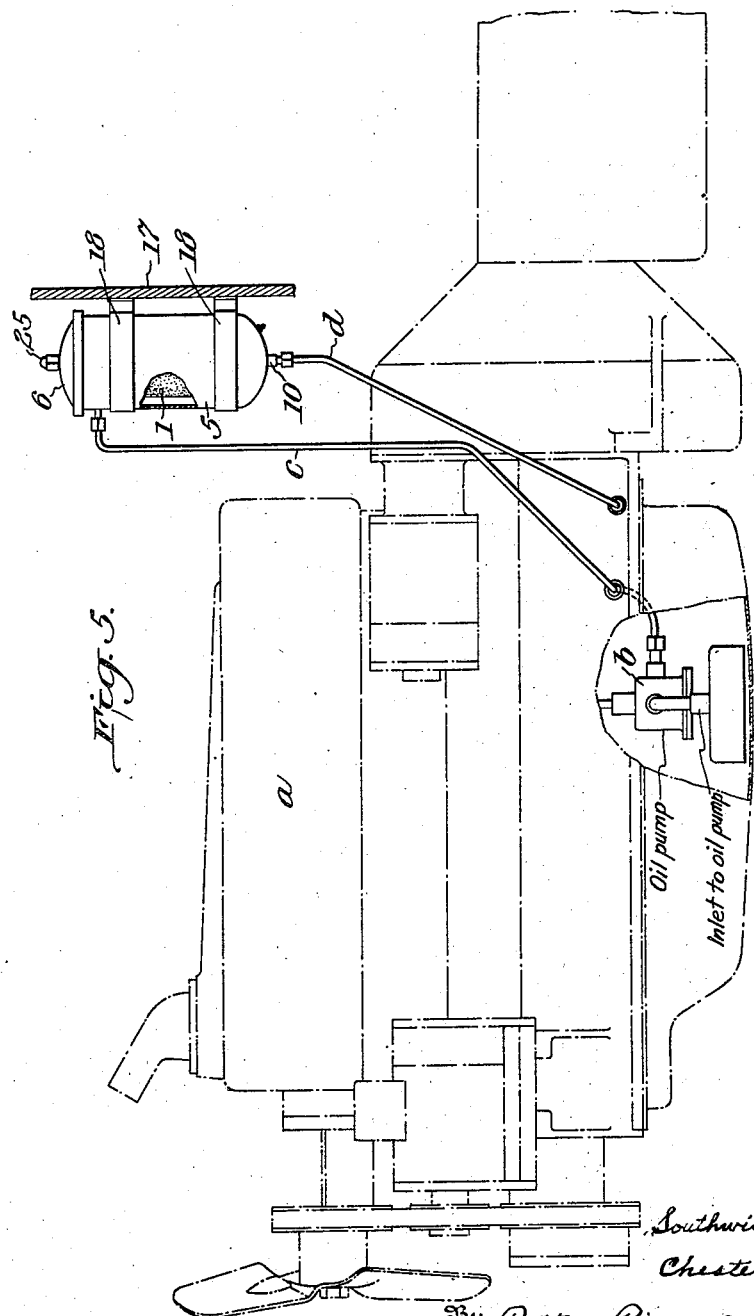

Patented July 15, 1941

2,249,681

UNITED STATES PATENT OFFICE 2,249,681

POROUS BLOCK FILTER IN LUBRICATING SYSTEM OF INTERNAL COMBUSTION ENGINES

Southwick W. Briggs and Chester G. Gilbert, Washington, D. C.; said Gilbert assignor to Briggs Clarifier Company, Washington, D. C., a corporation of Delaware Application April 1, 1936, Serial No. 72,172

4 Claims. (Cl. 210—112)

This invention relates to the filtration and purification of lubricating oil in the closed-circulation lubricating oil system of an internal combustion engine, and is concerned more particularly with the provision of a replaceable filter block unit adapted for use in the filter of such a closed lubricating oil system.

There is, very properly, a growing appreciation of the desirability of continuous filtration of the circulating lubricating oil of an internal combustion engine. It is desirable to remove from the circulating oil not only the solid matter (carbon, metal particles, and the like) but also any acidic bodies developed in the oil during use. Such acidic bodies may or may not be fluids: they generally are soluble in the lubricating oil. For removing acids as well as solid particles from circulating lubricating oil prior investigators have considered the use of mineral adsorbents, which latter have outstanding properties with respect to selective adsorption of acids developed in lubricating oil. In such use, mineral adsorbents have been employed in the form of loose beds. Filtration of circulating lubricating oil through a loose bed of mineral adsorbent is open to, among others, the following disadvantages:

1. Relatively small filtering surface (as contrasted with the total mass of the filter bed);
2. Tendency to channelling during continued use;
3. Migration of fines;
4. Shifting of filter bed;
5. Fragility; and
6. Premature stoppage by solids.

Because of certain of these disadvantages, inherent in the loose bed type of portable filter, filtration of the circulating lubricating oil during use (as in an automobile, truck, bus, airplane, or the like) was apt to be non-uniform, uneconomical, and undependable.

Under the hood of a vehicle powered by an internal combustion engine there is, usually, only a limited space available for the installation of a filter for the circulating lubricating oil: this space, in the average commercial vehicle, is at most 12 inches (vertical dimension) by 8 inches by 8 inches (overall including fittings, etc.), and in specific instances is considerably less. This situation roughly determines in advance the total size and, to some extent, the shape, of the filter. Again, in the case of trucks, buses and other commercial vehicles (particularly fleets of vehicles) the "life" of the filtering medium must roughly coincide with the "life" of the grease job—e. g., 2500 to 3000 miles—so that change of the fouled filtering medium may be effected at the same time that the vehicle is greased. Hence, the amount of filtering medium must be proportioned in view of its "life" requirements. For an average bus or truck these factors indicate the use of an amount of mineral adsorbent filtering medium corresponding, in the case of fuller's earth, for example, to about 2 pounds of the loose material. In preparing a filter bed of loose fuller's earth one must have a bed of at least 4 inches depth.

Two pounds of loose fuller's earth yields a mass 5.5 inches in diameter by 6 inches deep, the extent of which mass must of course be added to by the volume of the container for the mass, the encasing means (filter shell), the fittings, etc.: these factors necessitate a space of at least 8.5 inches in diameter by 10 inches in height. For a filter using loose adsorbent, the only installation position possible is vertical.

An object of the present invention is the provision of a porous block filtering means adapted for use in the lubricating oil circulatory system of an internal combustion engine. Another object of the invention is the provision of an improved filter for imposition in the lubricating oil circulatory system of an internal combustion engine, the filtering element of which filter comprises a porous block filtering means having adsorbent properties with respect to moisture and acidic bodies in the circulating oil. Other objects of invention will be apparent from a consideration of the following.

We have found that the above-mentioned disadvantages of loose-type adsorbent filtering means may be overcome, and that continuous filtration of, and acid removal from, the circulating oil of a lubricating oil system of an internal combustion engine may be effected with improved results by imposing in such lubricating oil system a molded mineral adsorbent block and causing the circulating oil to pass therethrough.

In our application Serial No. 13,533, filed March 28, 1935, we described the consolidation of loose mineral adsorbents into unitary masses of predetermined shape. It was there disclosed that loose, finely divided, mineral adsorbent could be formed into unitary shapes of desirable strength, and without any substantial loss of adsorbing power, by admixing the mineral adsorbent in dehydrated activated form with a viscous cementing liquid whose set is dependent upon the withdrawal of solvent liquid therefrom, under conditions making possible the abstraction of solvent liquid from the cement at a rate more rapid than is the rate of adjustment of the cement to the point of rigidity, inducing a porous set in the cement, and drying and reactivating the mass. The present invention deals with a specific replaceable filter block unit for the circulating oil of the lubricating oil system of an internal combustion engine, in the fabrication of which filter block unit the above-described idea of consolidation is embodied. According thereto, a finely-divided mineral adsorbent material is admixed with suitable liquid binding agent, the mixture is molded into a desired shape (with or without pressure beyond that necessary for bringing the mixture into a mass), the molded article is dried, and then heat-treated and, if necessary, or desirable, after-treated. The resulting unitary block or shape of consolidated mineral adsorbent is then installed in a closable receptacle provided with means for leading the circulating lubricating oil into and removing filtered lubricating oil from the same. This closable receptacle may be a substantial duplicate of the casing of the conventional lubricating oil filter of an automobile, truck, bus, airplane or the like, which casing is connected to the engine crank case by the customary lead and return pipes or conduits. In the case of our device it is desirable that the block be hollow.

In certain instances, notably where gelatinous acid sludges are present, e. g., in the cases of small, high-speed marine Diesel engines and of automotive gasoline engines, it is desirable to filter with an accelerating rate of flow, in order that any sludge not stopped at the entrant surface of the filtering medium body will be swept through the body, thus minimizing any tendency to choke or clog the pores of the latter. In other instances, notably where the foreign solids are not coagulated, e. g., as in the case of the circulating oil system of a substantially constant-speed, substantially continuously operated, stationary Diesel-operated power plant, it manifestly is desirable to filter with a decelerating rate of flow, in order that the solid particles may be picked up progressively in the course of passage of the oil through the body of filtering medium.

The disclosed filter form rendered practical by molding adsorbent masses is peculiarly adapted for use in connection with both types of filtration discussed above. Thus, where gelatinous acid sludges are encountered in the circulating lubricating oil to be filtered, the molded block of mineral adsorbent is so related to the filter casing and other parts of the system that incoming oil is forced against the outer surfaces of the hollow block toward the interior thereof, from which interior filtered oil is conducted to the return pipe of the system. Any sludge accumulating at the entrant surface tends (because of vibration of the portable unit, in use, in conjunction with the force of gravity) to move downwardly along said surface to the lower portion of the casing. In the use of our filter unit, sludge is or may be encountered in connection with the clean-up of a previously fouled crank case in which a customary strainer or so-called "filter" had been used. Sludge formation does not occur once the system is cleaned up, due to constant removal of acids (mineral, or organic) and water from the oil circulated through our filtering medium: this is due to the fact that our filtering medium has selective adsorbent affinity for water, which water, allowed to remain in the oil, carries any mineral acid which may adventitiously be present in the oil.

Also, where gelatinous sludges are absent and the problem resides in removal from the oil of relatively large quantities of non-coagulated, dispersed, carbon particles, it frequently is advantageous to reverse the "normal" procedure above described by forcing the oil to be filtered against the inner surface of the molded filter body and through the latter outwardly. Thereby a decelerated rate of flow is provided.

While we prefer that the block be in the form of a cylinder with an axial opening therethrough the invention is not limited thereto since, as will readily be appreciated, the replaceable filtering unit may be otherwise shaped, e. g., in the form of a hollow sphere, or cone, or thimble, or the like. Also it will be appreciated that the outer surface of such cylindrical molded block may be smooth or it may be corrugated or otherwise convoluted.

Extensive tests of the replaceable filter unit have established that the latter offers, among others, the following advantages:

1. Relatively large filtering surface (as contrasted with beds of loose mineral adsorbents);
2. No channelling, shifting, or migration of fines;
3. Uniformity of filtering, assured by ability to control the grain size of the mineral adsorbent, the density of the block, etc., to predetermined standards;
4. Degree of filtration controllable; and
5. A much longer "life" than beds of loose mineral adsorbent.

In addition it has the following advantages, from a strictly commercial viewpoint:

6. Much cheaper to produce than is the bed-type (loose) mineral adsorbent filter unit;
7. Susceptible to exact duplication as to filtering capactiy, acid adsorption capacity, etc.;
8. Can be produced from cheaper grades of mineral adsorbent than can be used in making up the loose bed type of unit; and
9. Can be produced from 40–60 mesh mineral adsorbent particles without necessity of using finer grains.

We have found that the porous block replaceable filter unit of the present invention is characterized by toughness and crushing strength properties in excess of any requirements in connection with automotive and airplane engines. Thus, for instance, the crushing strength is at least as great as, and may be greater than, that of commercial building tile; e. g., 370 pounds per square inch. When test sample blocks were broken (crushing strength test) it was found that they broke with about a 45° shear. Tests involving the alternate freezing and thawing of water-wet blocks (simulating extreme winter operations) have established that the mineral adsorbent block of the present invention is not weakened thereby.

A further advantage flowing from the use of the aforesaid porous block as the filtering unit of an automotive engine is that in starting the engine (cold), flow of the lubricating oil through the porous block can be established in 3 minutes, whereas, under the same temperature and other conditions, in the case of a loose bed of the same mineral adsorbent, of 4 inches depth, flow could not be established before 15 minutes. This probably may be explained by the fact that we have proportioned the thickness of the mass to be traversed to the pressure available at, say, zero° F., on a 30 S. A. E. oil, so that the pressure will push the oil through the porous block even in the form of a jelly or grease. Thus, we provide a molded mineral adsorbent block having an effective depth (i. e., wall thickness) of about 1 to 1.5 inches, finding that such a depth of the molded mineral adsorbent provides as effective filtration as does a loose bed (of the same mineral adsorbent) of 4 inches or more depth.

The porous block replaceable filtering unit of the present invention may be fabricated from any one of a plurality of known mineral adsorbents, including activated fuller's earth, activated alumina, activated glaucosil, activated acid-treated zeolites, etc. With the selection of an appropriate mineral adsorbent the same may be formed into a unitary mass by the agency of any appropriate binding material. It is within the scope of our invention to omit added binding material, the mineral adsorbent particles being consolidated into a unitary shape by the aid of heat alone (sintering).

The invention will be described with greater particularity in the following taken in connection with the accompanying drawings in which:

Fig. 1 is an axial sectional perspective view of a porous block replaceable filtering unit in accordance with the prevent invention;

Fig. 2 is an axial sectional view through a modified form of replaceable filtering unit involving the porous block feature shown in Fig. 1;

Fig. 3 is an axial sectional view through a filter interposed in the circulating lubricating oil system of an automatic engine, showing the replaceable filtering element illustrated in Fig. 2;

Fig. 4 illustrates a modified form of tie rod; and

Fig. 5 is a schematic view illustrating a concrete example of the application of the invention in a specific embodiment.

Referring to Fig. 1, the reference numeral 1 represents a cylindrical block of consolidated molded mineral adsorbent provided with an axial opening, 2. The mineral adsorbent block may comprise fuller's earth, alumina or the like, but preferably comprises dehydrated activated fuller's earth particles bonded together by means of an inorganic, porous, silicious binding material. It may, as a specific illustration, be prepared as follows: Fuller's earth which has been fully roasted at a temperature of about 1100° F. and thereafter not exposed to air more than was absolutely necessary is admixed, in a positive mixer, with the desired amount (not less than 1 part to each 4 parts by weight of the roasted earth), of a viscous water glass of a viscosity of about 150,000 poises and carrying approximately 40% of water, the mixing being for as short an interval as is consistent with obtaining complete distribution, and the batch is molded as quickly as possible in a cored cylindrical mold, under a controlled and predetermined pressure, e. g., a pressure of the order of 500 pounds per square inch, to the shape shown in Fig. 1. Preferably, the batch in the mold is compressed therein between opposed plungers, to insure uniformity in compacting. Thereafter the molded product is carefully dried and then baked, in the manner usual in connection with the use of sodium silicate as cement, to a predetermined elevated temperature, e. g., 470° C., and finally may be leached with water and again re-activated (heated) at the desired activating temperature for the mineral adsorbent, e. g., at a temperature of the order of 500° C. or more.

We have found that under certain conditions it is advantageous to surround the cylindrical, porous, mineral adsorbent block with a plurality of wrappings (e. g., four, more or less) of compressed and corrugated cellulose wadding, as shown in Fig. 2. In said figure, the layers of cellulose wadding are shown at 3, being retained in position about the block by means of a plurality of resilient endless bands, 4, which may be and preferably are in the form of helical springs.

We have found that the cellulose wadding retains coarser solid particles of the oil, while the porous block retains finer particles and adsorbs acids. It will be appreciated that the porous block would not be passed by coarser solid particles, and that the wadding wrap serves to protect the surfaces of the porous block from early pollution by such particles. Accordingly, the cellulose wadding may with a certain amount of success be replaced by other known filtering media for retaining coarse solid particles.

An automotive filter assembly in accordance with the present invention is illustrated in Fig. 3. In said figure, the replaceable filtering unit shown in Fig. 2 (i. e., the unit consisting of an axially bored cylindrical block of consolidated mineral adsorbent, 1, 2, surrounded by a plurality of wrappings of compressed and corrugated cellulose wadding 3 retained in position by resilient retaining members 4) is shown mounted in a filter, although it is to be understood that in that assembly the filtering unit shown in Fig. 1 may be substituted.

Reference numeral 5 represents a cylindrical casing permanently closed at one end and closable at its other end by means of a removable cover 6. The casing is provided, at any desired point therealong, with a threaded opening 7, for the reception of an inlet pipe (not shown in Fig. 3) leading from the oil pump of an internal combustion engine. The opening 7 might be placed in the cover 6, the only disadvantage therefrom being that easy removal and replacement of cover 6 on casing 5 thereby would be impeded. At the end of casing 5 opposite the cover there is an axially positioned opening 8 closed by the projecting end 9 of a tie rod 10 which passes completely through the casing and cover. Casing 5 may be provided with a draining means, e .g., a drain plug p, as is indicated in Fig. 3. Tie rod 10 is secured to the casing 5 in any appropriate manner such as, for instance, welded (shown) or screw threaded (as sugggested in Fig. 4).

Cover 6, which is provided with an annular gasket 11 for tight fit against the open end of casing 5, is provided with an axial opening 12 for easy removal and replacement of the cover over tie rod 10. 25 represents a nut threaded on tie rod 10 for maintaining the cover 6 in closed position on casing 5.

To tie rod 10, at a point near the closed end of casing 5 there is secured a disk or circular plate 13 upon which the replaceable filtering unit is mounted. Plate 13 may be welded to the tie rod (as shown), or it may be screw-threaded thereto (as suggested in Fig. 4).

Tie rod 10 is bored upwardly from the oil outlet end thereof at least as far as a point above and adjacent to plate 13, the opening being represented in Fig. 3 by reference numeral 14. The oil outlet end of the tie rod may be and preferably is provided with internal threads, represented at 15, to receive the customary connecting fitting for an oil return pipe. The bored tie rod is provided, at a point above and adjacent to plate 13, with a cross bore 16 providing communication between the interior of the casing and the bore 14 of the tie rod.

Fig. 5 illustrates a concrete embodiment of the invention. In said figure, reference letter *a* represents a conventional automobile engine in the crank case oil sump of which is located an oil pump *b*. On the pressure side of pump *b* is a pipe *c* communicating between the pump and the interior of the filter casing 5. A return oil line *d* is shown communicating between the bored tie rod 10 and the engine bearings to which the filtered oil flows.

As is illustrated in Fig. 4, the tie rod for the filter assembly may be a tube 10′ having a central opening 14′ therethrough. In this case the tube 10′ is threaded at the end portion remote from the oil outlet end. Tube 10′ may be fixed in position in the axial opening 8 of the casing 5 by screw threads as indicated, or, it may be welded, brazed or soldered therein.

The casing is mounted on any solid support, e. g., on the dashboard 17, as by means of supporting bands 18, 18, and suitable bolts 19, 19.

In mounting the replaceable porous block filtering unit in the casing, there is slipped over the "upper" end of the rod 10 an annular, foraminous, walled cylinder 20 consisting of a helical spring 21 wrapped with wire cloth (e. g., 100 mesh brass wire cloth) 22. The foraminous cylinder fits the tie rod 10 loosely, and likewise loosely fits the bore of the porous block 2. The porous block filtering unit (Fig. 1 or Fig. 2) is slipped over the tie rod 10 and the foraminous walled cylinder 20 and rested on plate 13: an upper plate 23 closely fitting the inner wall of casing 5 is placed over the filtering unit and pressed against the latter by the drawing down of nut 24; then the cover 6 is placed in position, and this latter is drawn down against the upper (open) end of casing 5 by means of nut 25. Plate 23 may have one or more cut-away portions of aid in removing the plate from the assembly. To replace the filter assembly it is necessary only to remove nut 25, cover 6, nut 24 and plate 23, then lift out the fouled filtering unit, drop a new filtering unit in its place, and then replace plate 23, nut 24, cover 6 and nut 25; all a matter of a few minutes.

The replaceable porous block filtering unit of the present invention is "foolproof," simple in construction and in use, relatively inexpensive, and lends itself to quick and easy replacement. It is applicable in the continuous filtration of circulating lubricating oil of all internal combustion engines, and is especially advantageous in the case of high specific output engines.

As will be apparent, the filter assembly using our replaceable molded mineral adsorbent filter block need not be mounted vertically, but may be disposed at any angle to suit the space available.

For one specific application of the above described molded mineral adsorbent filtering unit, we employ a cylinder 4 inches in diameter and 8⅞ inches in length provided with an axial opening (bore) of 1 inch. Where plural wraps of corrugated cellulose wadding are employed, we preferably diminish the wall thickness of the fibrous layers whereby roughly to retain the same overall diameter of the unit; e. g., with a thickness of ½ inch of cellulose wadding we use a molded cylinder having a 1 inch wall.

Using the above sized unit, we employ a casing having a 5 inch diameter and about 11.5 inches in length.

It will be appreciated that where a decelerated rate of flow is desired, the course of the circulating oil through the filter may be the reverse of that above described, channel 14 being made the inlet means and outlet 7 being made the outlet means. In that event the tie rod 10 advantageously is closed, or left unchannelled, in the portion thereof adjacent the cover 6, and may be pierced by a plurality of openings 16 along that portion of the tie rod which is coextensive with the block 1 or 1′: also, the outlet 7 may be and desirably is, positioned adjacent the lower extremity of the casing 5.

We claim:

1. In a lubricating oil circulatory system of an internal combustion engine including a filter and means for forcing lubricating oil into the filter and for returning filtered oil to the engine parts, a replaceable porous filter block of molded mineral adsorbent consisting essentially of a unitary mass of activated mineral adsorbent particles bonded together by means of a porous solid binding matrix produced in situ, in which latter pores largely communicate with pores of the mineral adsorbent particles, the mass containing at least one part by weight of the binding matrix to each 4 parts by weight of the mineral adsorbent.

2. A porous filter block unit for a lubricating system of a vehicle comprising an axially bored cylinder of molded mineral adsorbent consisting essentially of a unitary mass of activated mineral adsorbent particles bonded together by means of a porous solid binding matrix produced in situ, in which latter pores largely communicate with pores of the mineral adsorbent particles, the mass containing at least one part by weight of the binding matrix to each 4 parts by weight of the mineral adsorbent.

3. A porous filter block unit for a lubricating system of a vehicle comprising an axially bored cylinder of molded mineral adsorbent and a plurality of wrappings of a fibrous filtering material about the outer surface of said cylinder and retained thereon by means of a plurality of resilient retaining members said porous filter block consisting essentially of a unitary mass of activated mineral adsorbent particles bonded together by means of a porous solid binding matrix produced in situ, in which latter pores largely communicate with pores of the mineral adsorbent particles, the mass containing at least one part by weight of the binding matrix to each 4 parts by weight of the mineral adsorbent.

4. A porous filter block unit for use in a pressure circulatory system of an internal combustion engine comprising an axially bored cylinder consisting essentially of a mass of activated mineral adsorbent particles bonded together by means of a porous silicious solid binding matrix produced in situ, in which latter pores largely communicate with pores of the mineral adsorbent particles, and a plurality of wrappings of a fibrous filter material about the outer surface of said cylinder and retained thereon by means of a resilient retaining member.

SOUTHWICK W. BRIGGS.
CHESTER G. GILBERT.